United States Patent
Kawano et al.

(10) Patent No.: US 7,908,453 B2
(45) Date of Patent: Mar. 15, 2011

(54) SEMICONDUCTOR DEVICE HAVING A DYNAMICALLY RECONFIGURABLE CIRCUIT CONFIGURATION

(75) Inventors: Tetsuo Kawano, Kawasaki (JP); Hiroshi Furukawa, Kawasaki (JP); Ichiro Kasama, Kawasaki (JP); Kazuaki Imafuku, Kawasaki (JP); Toshiaki Suzuki, Kawasaki (JP); Miyoshi Saito, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 169 days.

(21) Appl. No.: 11/167,310

(22) Filed: Jun. 28, 2005

(65) Prior Publication Data

US 2006/0004979 A1   Jan. 5, 2006

(30) Foreign Application Priority Data

Jun. 30, 2004 (JP) .................. 2004-194103

(51) Int. Cl.
  *G06F 13/00* (2006.01)
(52) U.S. Cl. ........ 711/170; 711/171; 711/172; 711/173; 711/105; 365/230.05; 365/230.03
(58) Field of Classification Search .......... 711/170–173, 711/105; 365/230.05, 230.03
  See application file for complete search history.

(56) References Cited

U.S. PATENT DOCUMENTS

| | | | | |
|---|---|---|---|---|
| 4,747,070 A * | 5/1988 | Trottier et al. | ................ | 345/568 |
| 5,572,692 A * | 11/1996 | Murdoch et al. | ................ | 711/5 |
| 5,708,597 A * | 1/1998 | Kelem | ................ | 365/230.03 |
| 5,784,699 A | 7/1998 | McMahon et al. | | |
| 5,915,265 A * | 6/1999 | Crocker et al. | ................ | 711/170 |
| 6,185,654 B1 * | 2/2001 | Van Doren | ................ | 711/5 |
| 6,201,406 B1 * | 3/2001 | Iwanczuk et al. | ................ | 326/38 |
| 6,279,096 B1 | 8/2001 | McCoy et al. | | |
| 6,373,774 B2 * | 4/2002 | Ishikawa et al. | ................ | 365/230.03 |
| 6,473,845 B1 | 10/2002 | Hornung et al. | | |
| 6,502,161 B1 * | 12/2002 | Perego et al. | ................ | 711/5 |
| 6,553,552 B1 * | 4/2003 | Khan et al. | ................ | 716/10 |
| 6,643,758 B2 * | 11/2003 | Furuyama et al. | ................ | 711/203 |
| 6,678,269 B1 * | 1/2004 | Michels et al. | ................ | 370/389 |
| 6,691,193 B1 | 2/2004 | Wang et al. | | |
| 6,826,674 B1 | 11/2004 | Sato | | |
| 6,868,017 B2 | 3/2005 | Ikeda | | |
| 6,904,514 B1 | 6/2005 | Sato | | |
| 7,096,324 B1 * | 8/2006 | May et al. | ................ | 711/149 |
| 2003/0061447 A1 * | 3/2003 | Perego et al. | ................ | 711/131 |
| 2003/0061531 A1 * | 3/2003 | Fletcher et al. | ................ | 714/7 |

(Continued)

FOREIGN PATENT DOCUMENTS

EP   1 045 307 A2   10/2000

(Continued)

OTHER PUBLICATIONS

Patent Abstracts of Japan: Ikumi Kouichi, "Parallel Processing System", Japanese Publication No. 1-94469, Publication Date: Apr. 13, 1989.

(Continued)

*Primary Examiner* — Hong Kim
(74) *Attorney, Agent, or Firm* — Staas & Halsey LLP (57) ABSTRACT

A semiconductor device includes a plurality of memories, a sequencer which outputs configuration information, and a memory reconfiguring circuit which reconfigures the memory area in accordance with the configuration information supplied from the sequencer. Since the memory reconfiguring circuit dynamically changes the allocation of the memories, it is possible to reconfigure the memory configuration and freely change the memory size in accordance with the purpose of use.

18 Claims, 5 Drawing Sheets

U.S. PATENT DOCUMENTS

| | | | |
|---|---|---|---|
| 2003/0154357 A1* | 8/2003 | Master et al. | 712/15 |
| 2003/0163769 A1* | 8/2003 | Phelps | 714/43 |
| 2004/0001296 A1 | 1/2004 | Saito et al. | |
| 2004/0015613 A1 | 1/2004 | Ikeda | |
| 2004/0019756 A1* | 1/2004 | Perego et al. | 711/170 |
| 2004/0109451 A1* | 6/2004 | Huang et al. | 370/392 |
| 2004/0221106 A1* | 11/2004 | Perego et al. | 711/115 |
| 2005/0038550 A1 | 2/2005 | Sato | |
| 2005/0240757 A1 | 10/2005 | Sato | |

FOREIGN PATENT DOCUMENTS

| | | | |
|---|---|---|---|
| JP | 2000163316 A * | 6/2000 | |
| JP | 2001-500682 | 1/2001 | |
| JP | 2004-40188 | 2/2004 | |
| JP | 2004-127245 | 4/2004 | |
| WO | 98/10517 | 3/1998 | |
| WO | WO 01/16711 A1 | 3/2001 | |
| WO | 02/056180 | 7/2002 | |
| WO | WO 03/007155 A1 | 1/2003 | |

OTHER PUBLICATIONS

Patent Abstracts of Japan: Kodaira Takatoshi, "Mechanism and Method for Parallel Calculation", Japanese Publication No. 5-108586, Publication Date: Apr. 30, 1993.

European Search Report mailed on Feb. 28, 2008 in the corresponding European patent application No. 07119502.8.

Communication from the Japanese Patent Office mailed Sep. 30, 2008 in the corresponding Japanese patent application.

* cited by examiner

SEMICONDUCTOR DEVICE HAVING A DYNAMICALLY RECONFIGURABLE CIRCUIT CONFIGURATION

CROSS-REFERENCE TO RELATED APPLICATIONS

This application is based upon and claims the benefit of priority from the prior Japanese Patent Application No. 2004-194103, filed on Jun. 30, 2004, the entire contents of which are incorporated herein by reference.

BACKGROUND OF THE INVENTION

1. Field of the Invention

The present invention relates to a semiconductor device and, more particularly, to a semiconductor device having a dynamically reconfigurable circuit configuration.

2. Description of the Related Art

A conventional semiconductor device such as an LSI is generally fabricated to be able to execute predetermined processing meeting required specifications, by determining, in a designing step, the arrangement of AND gates, OR gates, and the like and their interconnections so as to execute the predetermined processing. That is, to realize a desired function in a conventional semiconductor device, this semiconductor device realizing the function is fabricated by designing the circuit configuration (logic configuration) for each gate (on each gate level).

By contrast, a certain semiconductor device can change processing to be executed, even after its fabrication, by reconfiguring its circuit configuration. This reconfigurable semiconductor device has a plurality of arithmetic units capable of changing their functions, and can change processing to be executed by reconfiguring the circuit configuration in response to a control signal (configuration information) from a CPU.

Figure 5:
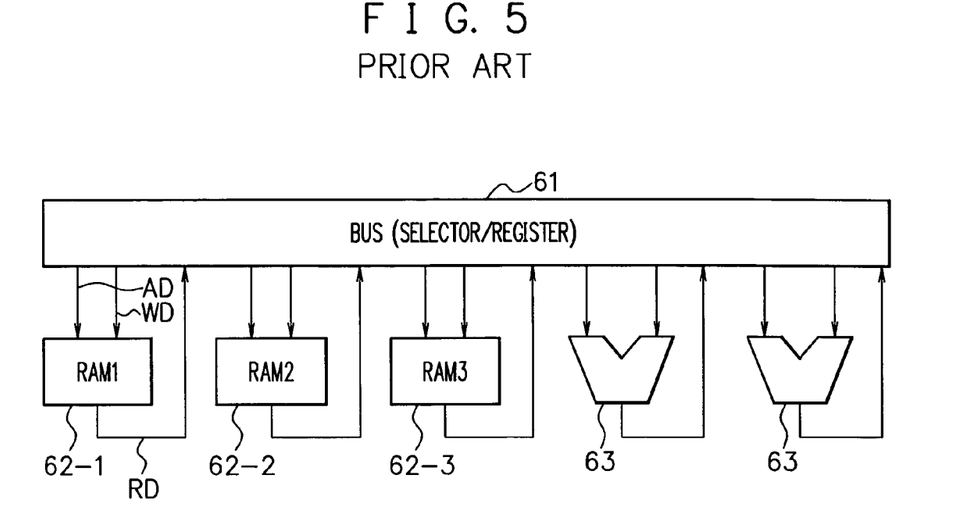
FIG. 5 is a view for explaining the memory configuration of a conventional reconfigurable semiconductor device.

In this conventional reconfigurable semiconductor device as described above, a plurality of memories (RAM1 to RAM3) 62-1 to 62-3 each having a predetermined memory capacity are arranged as shown in FIG. 5 to realize a desired function required by the user. In FIG. 5, reference numeral 61 denotes a bus (selector/register); and 63, an arithmetic unit. Although the arithmetic unit 63 is schematically illustrated as one arithmetic device, it is made up of a plurality of circuits (arithmetic devices or the like) in practice.

Unfortunately, although the conventional reconfigurable semiconductor device has the memories 62-1 to 62-3 as shown in FIG. 5, the memory size of each memory cannot be changed. Therefore, an inconvenience such as insufficiency of an address area occurs depending on the purpose (application). This sometimes extremely worsens the ease of use.

For example, even when the memories 62-1 to 62-3 shown in FIG. 5 each have the same memory capacity and the memories 62-1 and 62-2 have unused areas, these unused areas cannot be used as RAM3. Also, when, for example, the memories 62-1 to 62-3 are capable of inputting and outputting 64-bit data and the arithmetic unit 63 requires 128-bit data, this 128-bit data cannot be obtained at once. Therefore, 64-bit data is read out first, and then the remaining 64-bit data is read out by switching the memories.

If specifications are predetermined such as in normal board design, memories having optimum sizes are arranged in accordance with the specifications so as not to produce any unnecessary memory areas. However, the reconfigurable semiconductor device is so fabricated that the specifications can be changed even after fabrication. Since an application as an object is changeable, no optimum memory size can be determined. Accordingly, even when the reconfigurable semiconductor device has a large amount of memories, they are not effectively used in many cases.

In the fields of parallel processing using a plurality of conventional processors, a technique by which the processors optimize each local memory by reconfiguring the memory configuration by using switches and a technique by which the processors access an opponent buffer memory across a bus switch network are disclosed (e.g., Patent Documents 1 and 2).

[Patent Document 1]
 Japanese Patent Application Laid-open No. Hei 1-94469
[Patent Document 2]
 Japanese Patent Application Laid-open No. Hei 5-108586

SUMMARY OF THE INVENTION

It is an object of the present invention to freely change the size of a memory used in a semiconductor device having a dynamically reconfigurable circuit configuration.

A semiconductor device of the present invention comprises a plurality of memories, a control circuit which outputs configuration information, and a memory reconfiguring circuit which reconfigures a memory area formed by the plurality of memories in accordance with the configuration information. The memory reconfiguring circuit dynamically changes the allocation of the memories to memory ports in accordance with the supplied configuration information.

DETAILED DESCRIPTION OF THE PREFERRED EMBODIMENTS

An embodiment of the present invention will be described below with reference to the accompanying drawings.

First, the principle according to the embodiment of the present invention will be explained below with reference to FIGS. 1A and 1B.

Figure 1A:
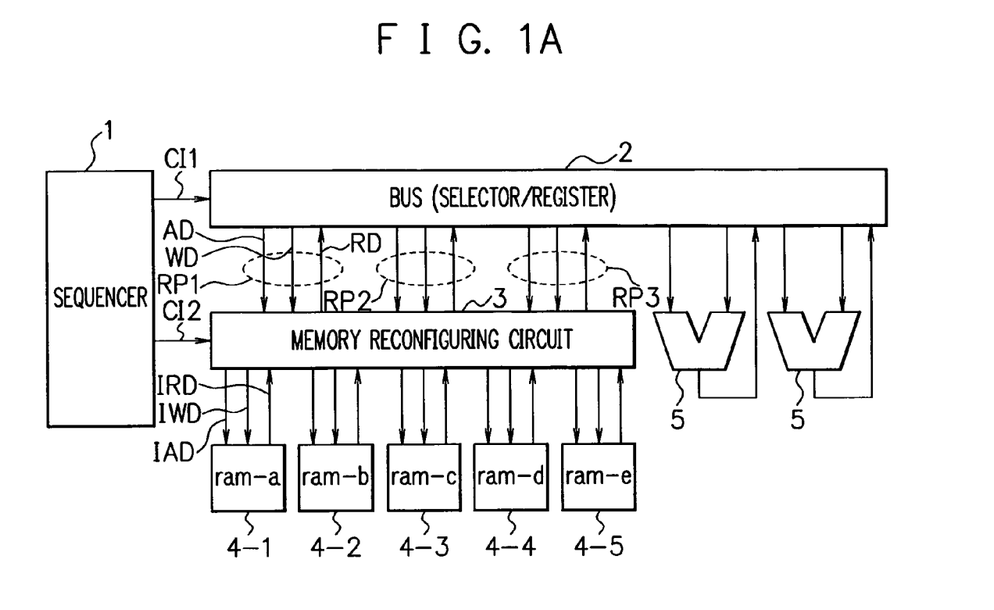
FIGS. 1A and 1B are views for explaining the principle according to an embodiment of the present invention.

FIG. 1A is a view for explaining the principle of a reconfigurable semiconductor device according to this embodiment. The reconfigurable semiconductor device according to this embodiment has a sequencer (control circuit) 1, a bus (selector/register) 2, a memory reconfiguring circuit 3, a plurality of memories (ram) 4-1 to 4-5, and a plurality of arithmetic units 5.

The sequencer 1 comprehensively controls the semiconductor device. The sequencer 1 manages and controls to dynamically change the circuit configurations of the bus 2, memory reconfiguring circuit 3, and arithmetic units 5. For example, the sequencer 1 generates configuration information which allows a dynamic circuit configuration change. The bus 2 supplies/receives data to/from the memory reconfiguring circuit 3 and arithmetic units 5 under the control of configuration information CI1 supplied from the sequencer 1.

The memory reconfiguring circuit 3 reconfigures a memory area in accordance with configuration information CI2 supplied from the sequencer 1. More specifically, on the basis of the configuration information CI2, the memory reconfiguring circuit 3 allocates one or a combination of some of the memories (ram) 4-1 to 4-5 to host memory ports (to be referred to as RAM ports hereinafter) RP1 to RP3.

The arithmetic units 5 change their circuit configurations on the basis of configuration information supplied from the sequencer 1, and perform arithmetic processing by using input data from the bus 2.

As shown in FIG. 1A, the RAM ports RP1 to RP3 are so arranged as to be able to exchange address signals AD, write data signals WD, and read data signals RD. Also, the memory reconfiguring circuit 3 and memories 4-1 to 4-5 are so connected as to be able to exchange internal address signals IAD, internal write data signals IWD, and internal read data signals IRD.

Figure 1B:
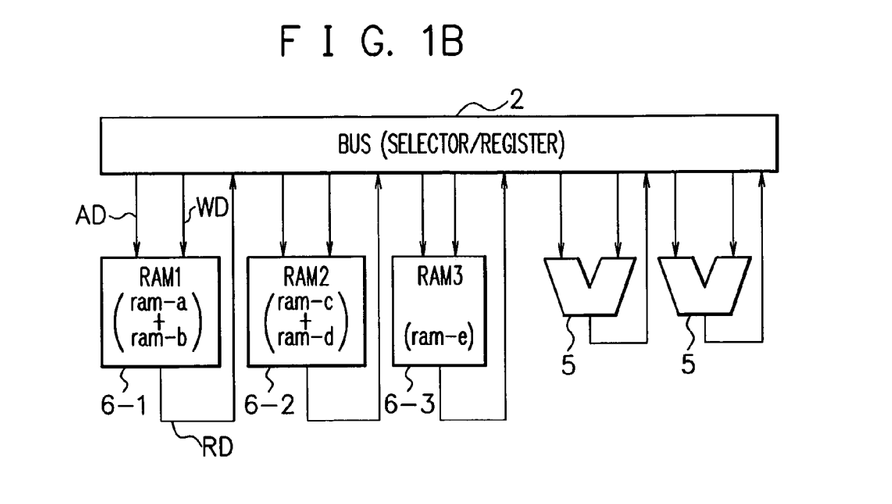

FIG. 1B shows an example of a memory area reconfigured by the memory reconfiguring circuit 3. In this example shown in FIG. 1B, the memories 4-1 and 4-2 (ram-a and ram-b) are allocated to the first RAM port RP1, the memories 4-3 and 4-4 (ram-c and ram-d) are allocated to the second RAM port RP2, and the memory 4-5 (ram-e) is allocated to the third RAM port RP3, in the arrangement shown in FIG. 1A.

That is, when viewed from the bus 2, the ram-a (4-1) and ram-b (4-2) are combined into a RAM1 (6-1), the ram-c (4-3) and ram-d (4-4) are combined into a RAM2 (6-2), and the ram-e (4-5) is a RAM3 (6-3). By thus reconfiguring the memory area by the memory reconfiguring circuit 3, the memory size can be changed and reconfigured in accordance with the purpose without changing the memories when viewed from outside these memories (from the bus 2).

Figure 2:
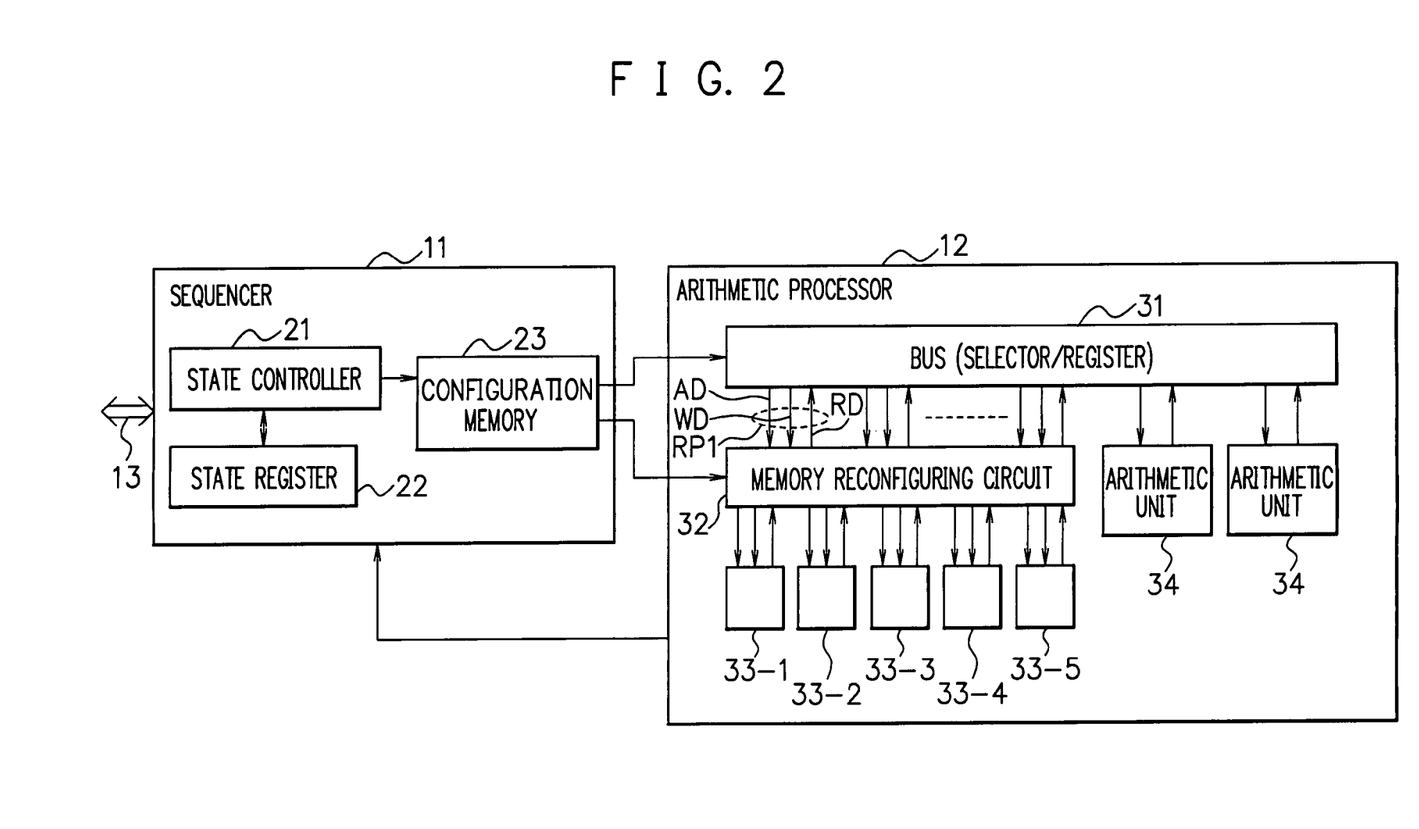
FIG. 2 is a view showing an example of the arrangement of a reconfigurable semiconductor device according to the embodiment of the present invention.

FIG. 2 is a view showing a practical arrangement of the reconfigurable semiconductor device according to this embodiment. As shown in FIG. 2, the reconfigurable semiconductor device according to this embodiment has a sequencer (control circuit) 11 and arithmetic processor 12.

The sequencer 11 comprehensively controls this semiconductor device in accordance with instructions from the outside (e.g., a processor connected via an external bus 13). The sequencer 11 manages and controls to dynamically change the circuit configuration of the arithmetic processor 12. The sequencer 11 generates configuration information for dynamically changing the circuit configuration of the arithmetic processor 12 in accordance with an application, and is connected to individual functional units of the arithmetic processor 12 via signal lines so as to be able to supply the configuration information.

The sequencer 11 has a state controller 21, state register 22, and configuration memory 23.

On the basis of, e.g., a preset sequence or a state transition indication signal from the arithmetic processor 12, the state controller 21 generates a configuration memory address for reading out, from the configuration memory 23, configuration information which changes the state (circuit configuration) of the arithmetic processor 12 to the next state, and also generates the read timing. The generation of the configuration memory address by the state controller 21 is done by referring to information indicative of the present state held in the state register 22. When the present state changes to the next state, the information held in the state register 22 is updated.

The configuration memory 23 stores configuration information which sets the circuit configuration of the arithmetic processor 12. All pieces of configuration information are externally prewritten in the configuration memory 23 before an operation is started, and held for each state. The configuration information stored in the configuration memory 23 is read out and output to the arithmetic processor 12 under the control of the state controller 21.

The arithmetic processor 12 has a bus (selector/register) 31, a memory reconfiguring circuit 32, a plurality of memories (data memories) 33-1 to 33-5, and a plurality of arithmetic units 34.

The bus 31 is controlled by the configuration information supplied from the sequencer 11. The bus 31 is connected to the memory reconfiguring circuit 32 and arithmetic units 34, and exchanges data between them.

More specifically, in accordance with the configuration information, the bus 31 supplies data to the arithmetic units 34, supplies data to be written in the memories 33-1 to 33-5 via the memory reconfiguring circuit 32, or receives data read out from the memories 33-1 to 33-5 via the memory reconfiguring circuit 32. Also, the bus 31 has a register function of temporarily holding data, and can output the held data in accordance with the configuration information.

The memory reconfiguring circuit 32 dynamically reconfigures a memory area formed by the memories 33-1 to 33-5, in accordance with the configuration information from the sequencer 11. That is, in accordance with the configuration information, the memory reconfiguring circuit 32 dynamically changes the allocation of the memories 33-1 to 33-5 to the RAM ports. The arrangement of the memory reconfiguring circuit 32 will be described in detail later.

The memories 33-1 to 33-5 store data and the like pertaining to processing in the arithmetic processor 12. The memories 33-1 to 33-5 are appropriately allocated to the host RAM ports when the memory reconfiguring circuit 32 reconfigures the memory area.

Each arithmetic unit 34 is formed by using, e.g., a shift circuit (shifter), ALU (Arithmetic and Logic Unit), and selector (for the sake of descriptive convenience, these components will also be simply referred to as arithmetic devices hereinafter without distinguishing between them). The arithmetic unit 34 performs a predetermined operation by using input data supplied from the bus 31, and outputs the operation result. Note that the arithmetic unit 34, more specifically, a plurality of arithmetic devices (or one arithmetic device) forming the arithmetic unit 34 can be appropriately selected and determined in accordance with an application to be used.

In the arithmetic unit 34, the operation mode of each arithmetic device and the connections between the arithmetic devices are set on the basis of the configuration information supplied from the sequencer 11. That is, the circuit configuration of each arithmetic unit 34 can be changed in accordance with the configuration information, and the individual arithmetic devices are so controlled as to realize desired functions such as addition, multiplication, bit operations, and logic operations (AND, OR, and EOR).

In a shift circuit, for example, a shift amount, an arithmetic shifting process, a logic shifting process, a masking process of a predetermined bit after the shifting process, and the like are controlled. Also, in an ALU formed by using, e.g., an AND (logic product operation) circuit and OR (logic sum operation) circuit, the circuit (arithmetic) function of the ALU as a whole is controlled by appropriately combining these circuits. In a selector, for example, one of a plurality of inputs, which is to be output, is controlled. Furthermore, the connections between the shift circuit, ALU, selector, and the like are controlled.

The reconfigurable semiconductor device having the sequencer 11 as described above makes so-called dynamic reconfiguration possible, and can dynamically configure the circuit configuration for each clock. For example, the memory reconfiguring circuit 32 can reconfigure the memory area for each clock, and can dynamically change the memory area, i.e., the allocation of the memories 33-1 to 33-5 for each clock. Also, the arithmetic processor 12 can perform function A during a certain clock period and perform function B different from function A during the next clock period on the basis of the configuration information from the sequencer 11.

Figure 3:
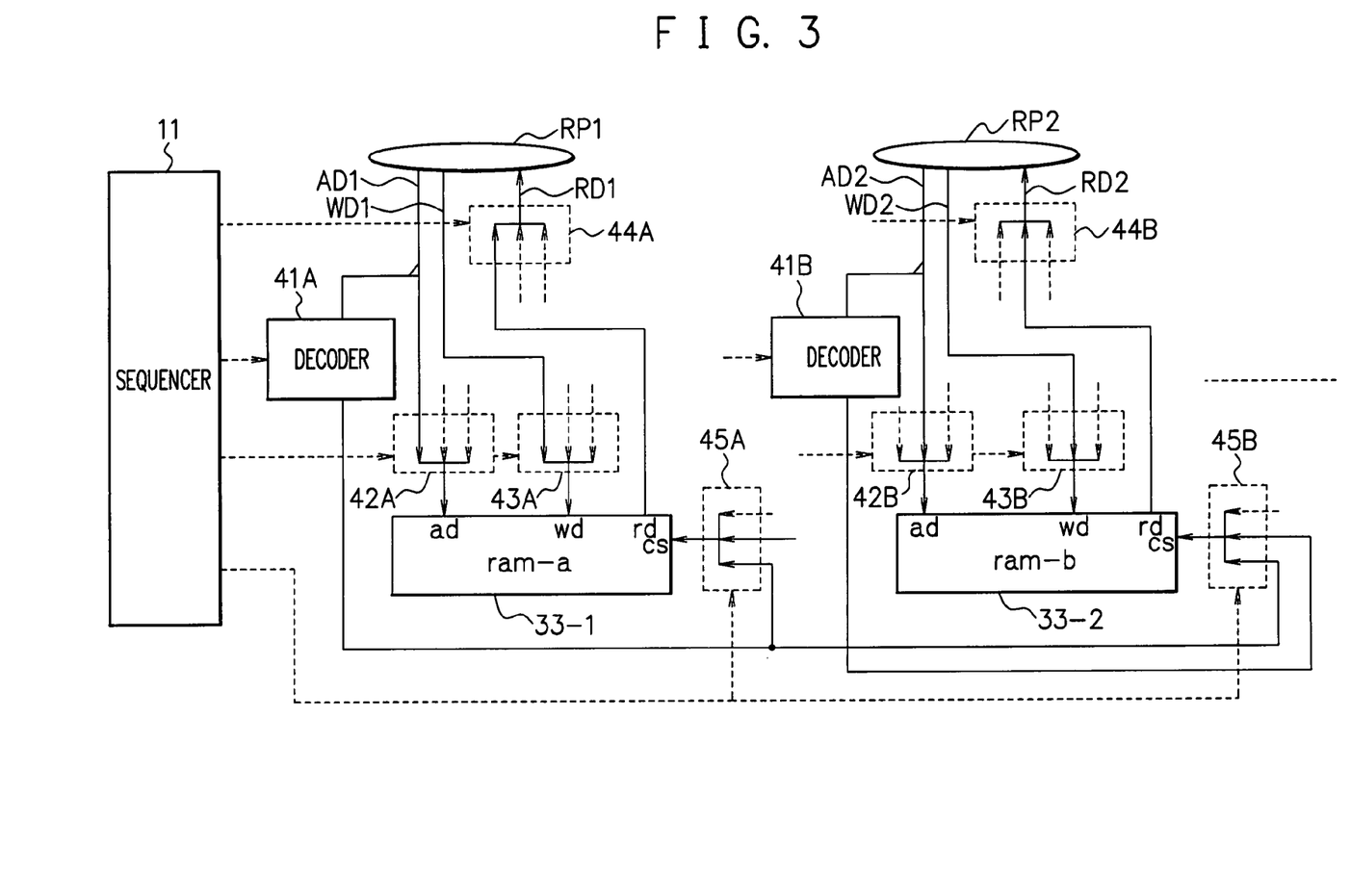
FIG. 3 is a view showing an example of the arrangement of a memory reconfiguring circuit.

FIG. 3 is a view showing an example of the arrangement of the memory reconfiguring circuit 32.

For the sake of descriptive convenience, FIG. 3 shows the sequencer 11, memories 33-1 and 33-2, and RAM ports RP1 and RP2, in addition to the memory reconfiguring circuit 32.

The memory reconfiguring circuit has decoders 41A and 41B and selectors 44A and 44B corresponding to the RAM ports RP1, RP2, . . . . The memory reconfiguring circuit also has selectors 42A, 42B, 43A, 43B, 45A, and 45B corresponding to the memories 33-1, 33-2, . . . .

As shown in FIG. 3, portions corresponding to the RAM ports RP1 and RP2 have identical arrangements, and portions corresponding to the memories 33-1 and 33-2 have identical arrangements. Therefore, the portions corresponding to the RAM port RP1 and memory 33-1 will be explained below as representatives.

The decoder 41A is supplied with and decodes predetermined bits of an address signal AD1 (e.g., several upper bits of an address AD1) input via the RAM port RP1. In addition, the decoder 41A outputs a decoded signal corresponding to the decoding result to the selectors 45A, 45B, . . . , corresponding to the memories 33-1, 33-2, . . . .

The selector 42A is supplied with addresses AD1, AD2, . . . (except for predetermined bits supplied to each decoder) input to the RAM ports RP1, RP2, . . . . The selector 42A selects one of the supplied addresses AD1, AD2, . . . , and outputs the selected address to an address input terminal ad of the memory 33-1.

Similarly, the selector 43A is supplied with write data signals WD1, WD2, . . . , input via the RAM ports RP1, RP2, . . . , selects one of these write data, and outputs the selected write data to a write data input terminal wd of the memory 33-1.

Also, the selector 44A is supplied with read data read out from the memories 33-1, 33-2, . . . , i.e., output from read data output terminals rd of these memories. The selector 44A selects one of these supplied read data, and outputs the selected read data as a read data signal RD1 via the RAM port RP1.

The selector 45A is supplied with the output decoded signals from the decoders 41A, 41B, . . . , selects one of these decoded signals, and outputs the selected decoded signal to a chip select input terminal cs of the memory 33-1.

Note that the decoder 41A and selectors 42A, 43A, 44A, and 45A are controlled on the basis of the configuration information supplied from the sequencer 11, and their circuit configurations can be dynamically changed in accordance with the configuration information. Note that a control signal (e.g., a read signal or write signal) for the memory 33-1 is supplied from the sequencer 11.

By configuring the memory reconfiguring circuit 32 as described above, decoded signals obtained by decoding predetermined bits of the address signals AD1, AD2, . . . , are input as chip select signals to the memories 33-1, 33-2, . . . , via the selectors 45A, 45B, . . . , thereby determining a memory to be used. For example, by using the memories 33-1 and 33-2 in a merged form and controlling the decoder 41A and selectors 45A and 45B such that a chip select signal is supplied to the memory 33-1 when the value of the most significant bit of the address AD1 is "0" and to the memory 33-2 when the value of the most significant bit is "1", the address area (the range of accessible address values) of the RAM port RP1 can be widened.

Also, by controlling the selectors 42, 43, 44, and 45 pertaining to addresses, write data, and read data on the basis of the configuration information supplied from the sequencer 11, it is possible to freely select a signal input via one of the RAM ports RP1, RP2, . . . , and to freely select one of the RAM ports RP1, RP2, . . . , to which a signal is to be output. This makes it possible to determine the allocation of the memories 33-1, 33-2, . . . , to the RAM ports RP1, RP2, . . . . Accordingly, the memory area can be dynamically reconfigured to form an arbitrary memory configuration in accordance with the configuration information supplied from the sequencer 11.

In this embodiment as described above, the memory reconfiguring circuit 32 dynamically changes the allocation of the memories to the RAM ports RP in accordance with the configuration information, and reconfigures the memory area formed by the memories 33-1 to 33-5. Therefore, it is possible to form a memory configuration and freely change the memory size in accordance with the purpose.

In the above embodiment, a reconfigurable semiconductor device having the five memories 33-1 to 33-5 and two arithmetic units 34 is explained as an example. However, the number of memories and the number of arithmetic units can be any arbitrary numbers.

Also, in the above embodiment, the address area is widened as an example. However, the present invention is not limited to this embodiment. For example, it is also possible to reconfigure the memory area by the memory reconfiguring circuit 32, and change the bit width of data input and output via the RAM ports. In this case, for example, if the width of the input/output data is smaller than the data bus width, a predetermined value can be supplied by using a data generator or the like to a signal line which is redundant with respect to the data bus.

In the above embodiment, a reconfigurable semiconductor device having one sequencer 11 and one arithmetic processor 12 is explained as an example. However, the present invention is also applicable to, e.g., a reconfigurable semiconductor device having a plurality of clusters as shown in FIG. 4.

Figure 4:
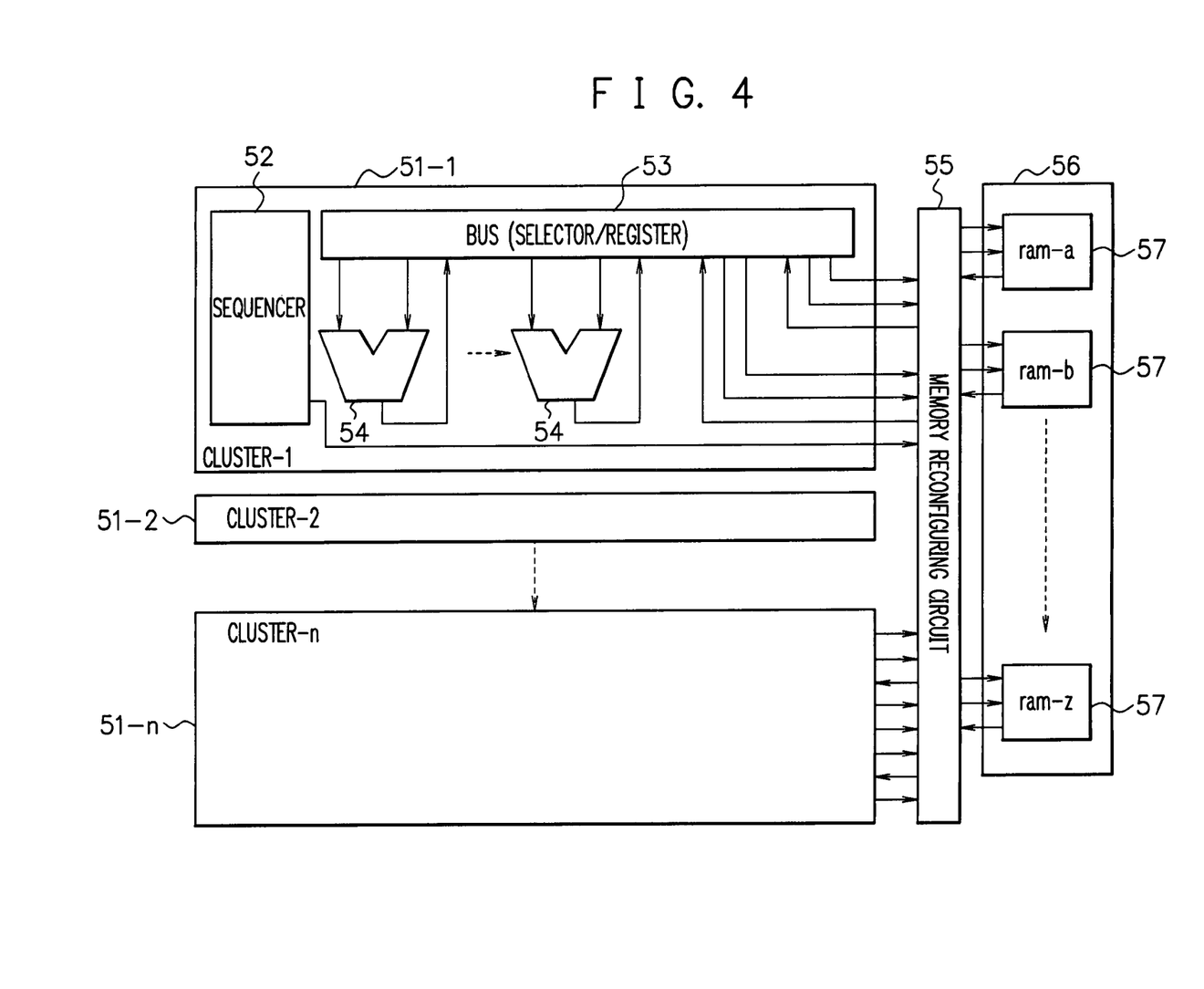
FIG. 4 is a view showing another example of the arrangement of the reconfigurable semiconductor device according to the embodiment.

FIG. 4 is a view showing another example of the arrangement of the reconfigurable semiconductor device according to this embodiment.

This reconfigurable semiconductor device shown in FIG. 4 has a plurality of clusters 51-1, 51-2, . . . , 51-$n$ ($n$ is an arbitrary natural number), a memory reconfiguring circuit 55, and a memory assembly 56 including a plurality of memories 57.

Each cluster is made up of a sequencer 52, a bus (selector/register) 53, and a plurality of arithmetic units 54. Note that the sequencer 52, bus 53, and arithmetic units 54 correspond to the sequencer 11, bus 31, and arithmetic units 34 shown in FIG. 2, so an explanation thereof will be omitted. Note also that the memory reconfiguring circuit 55 has the same arrangement and the like as described above except that one memory reconfiguring circuit 55 is formed outside the clusters 51-1, 51-2, . . . , 51-$n$, so an explanation thereof will be omitted.

As shown in FIG. 4, even when the clusters 51-1, 51-2, . . . , 51-$n$ are used, the memory assembly 56 is accessed via one memory reconfiguring circuit 55. Accordingly, the memory sizes used by the clusters 51-1, 51-2, . . . , 51-$n$ can be freely and dynamically changed.

The above embodiments are merely practical examples when the present invention is practiced, so the technical scope of the present invention should not be limitedly interpreted by these embodiments. That is, the present invention can be practiced in various forms without departing from the technical idea or principal features of the invention.

In the present invention, a memory reconfiguring circuit dynamically changes the allocation of memories in accordance with configuration information supplied from a control circuit. This makes it possible to reconfigure the memory configuration and freely change the memory size in accordance with the object of use.

What is claimed is:

1. A semiconductor device having a circuit configuration dynamically reconfigurable for each clock in accordance with configuration information, comprising:
   a plurality of memories;
   a plurality of arithmetic devices each having a circuit configuration that is dynamically reconfigurable in accordance with the configuration information;
   a control circuit outputting a first configuration information and a second configuration information and controlling a configuration of the semiconductor device;
   a memory reconfiguring circuit connected to said plurality of memories and reconfiguring a memory area formed by said plurality of memories in accordance with the second configuration information; and
   a bus connected to the plurality of arithmetic devices and connected to a plurality of host memory ports connected to the memory reconfiguring circuit in accordance with said first configuration information, wherein
   said memory reconfiguring circuit dynamically changes an allocation of said memories to said host memory ports for each clock in accordance with the second configuration information.

2. The device according to claim 1, wherein said memory reconfiguring circuit freely and dynamically changes the memory area in accordance with the second configuration information supplied from said control circuit.

3. The device according to claim 1, wherein said memory reconfiguring circuit allocates one or a combination of a plurality of said memories to said host memory ports in accordance with the second configuration information supplied from said control circuit.

4. The device according to claim 1, wherein said memory reconfiguring circuit comprises a decoder decoding an address signal input via said host memory ports, and wherein said memory reconfiguring circuit determines a memory to be used in accordance with the decoding result of said decoder.

5. The device according to claim 4, wherein a circuit configuration of said decoder can be dynamically changed in accordance with the second configuration information supplied from said control circuit.

6. The device according to claim 4, wherein said decoder decodes a certain upper bit or upper bits of the input address signal.

7. The device according to claim 1, wherein said memory reconfiguring circuit comprises a plurality of selectors selecting an address signal, write data signal, and read data signal exchanged via said host memory ports.

8. The device according to claim 7, wherein a circuit configuration of said plurality of selectors can be dynamically changed in accordance with the second configuration signal supplied from said control circuit.

9. The device according to claim 1, wherein said memory reconfiguring circuit comprises a decoder and first selector to which an address signal is input from said host memory ports, a second selector to which a write data signal is input from said host memory ports, and a third selector outputting, to said host memory ports, a read data signal concerning readout data from said memories.

10. The device according to claim 1, wherein said memory reconfiguring circuit reconfigures the memory area to widen a range of address values accessible from said host memory ports.

11. The device according to claim 1, wherein said memory reconfiguring circuit reconfigures the memory area to change a width of data input and output via said host memory ports.

12. The device according to claim 1, wherein a circuit configuration can be dynamically changed for each clock.

13. The device according to claim 1, wherein said control circuit comprises a configuration memory storing the configuration information.

14. A semiconductor device, comprising:
   a plurality of semiconductor circuits each having an arithmetic device with a circuit configuration dynamically reconfigurable for each clock in accordance with configuration information;
   a control circuit outputting a first configuration information and a second configuration information and controlling the configuration;
   a plurality of memories;
   a memory reconfiguring circuit connected to said plurality of memories and reconfiguring a memory area formed by said plurality of memories in accordance with the second configuration information; and
   a bus connected to the plurality of arithmetic devices and connected to a plurality of host memory ports connected to the memory reconfiguring circuit in accordance with said first configuration information, wherein
   said memory reconfiguring circuit dynamically changes an allocation of said memories to said semiconductor circuits for each clock in accordance with the second configuration information.

15. A semiconductor device having a circuit configuration dynamically reconfigurable for each clock in accordance with configuration information, comprising:
   a fixed plurality of memories;
   a plurality of arithmetic devices each having a circuit configuration that is dynamically reconfigurable in accordance with the configuration information;
   a control circuit outputting a first configuration information and a second configuration information and controlling a configuration of the semiconductor device;
   a memory reconfiguring circuit connected to said plurality of memories and reconfiguring a memory area formed by said fixed plurality of memories in accordance with the second configuration information; and
   a bus connected to the plurality of arithmetic devices and connected to a plurality of host memory ports connected to the memory reconfiguring circuit in accordance with said first configuration information, wherein
   said memory reconfiguring circuit dynamically changes an allocation of said memories to said host memory ports for each clock in accordance with the second configuration information.

16. The device according to claim 1, wherein the memory reconfiguring circuit allocates the memory to the host memory ports to correspond to the configuration of the arithmetic device being changed by the circuit configuration in accordance with the configuration information and based on the configuration information.

17. The device according to claim 14, wherein the memory reconfiguring circuit allocates the memory to the host memory ports to correspond to the configuration of the arithmetic device being changed by the circuit configuration in accordance with the configuration information and based on the configuration information.

18. The device according to claim 15, wherein the memory reconfiguring circuit allocates the memory to the host memory ports to correspond to the configuration of the arithmetic device being changed by the circuit configuration in accordance with the configuration information and based on the configuration information.

* * * * *